United States Patent
Maul et al.

(10) Patent No.: US 11,794,258 B2
(45) Date of Patent: Oct. 24, 2023

(54) SUBSEA PROCESSING MACHINE COMPRISING A TOOL HOLDER WITH A CHANGE HUB FOR RECEIVING ROTARY TOOLS

(71) Applicant: Schöning GmbH, Dortmund (DE)

(72) Inventors: Hans-Erich Maul, Aachen (DE); Tim Begiebing, Aachen (DE)

(73) Assignee: SCHÖNING GMBH, Dortmund (DE)

( * ) Notice: Subject to any disclaimer, the term of this patent is extended or adjusted under 35 U.S.C. 154(b) by 539 days.

(21) Appl. No.: 16/973,013

(22) PCT Filed: Jun. 6, 2019

(86) PCT No.: PCT/EP2019/064898
§ 371 (c)(1),
(2) Date: Dec. 7, 2020

(87) PCT Pub. No.: WO2019/234203
PCT Pub. Date: Dec. 12, 2019

(65) Prior Publication Data
US 2021/0252605 A1    Aug. 19, 2021

(30) Foreign Application Priority Data
Jun. 8, 2018   (DE) .......................... 102018113747.8

(51) Int. Cl.
*B23C 5/26*        (2006.01)
*B23B 31/107*    (2006.01)
*B23B 31/30*      (2006.01)

(52) U.S. Cl.
CPC ........ *B23B 31/10741* (2021.01); *B23C 5/265* (2013.01)

(58) Field of Classification Search
CPC ..... Y10T 279/17743; Y10T 279/17811; Y10T 409/309408; Y10T 409/30952;
(Continued)

(56) References Cited

U.S. PATENT DOCUMENTS

| 2,154,738 A | * | 4/1939 | Reuen | B21D 28/34 |
| | | | | 279/76 |
| 3,999,769 A | | 12/1976 | Bayer et al. | |

(Continued)

FOREIGN PATENT DOCUMENTS

| GB | 2 203 989 | 11/1988 |
| GB | 2503579 A | * 1/2014 |

OTHER PUBLICATIONS

International Search Report and the Written Opinion of the International Searching Authority for International Application No. PCT/EP2019/064898 dated Oct. 2, 2019.

*Primary Examiner* — Erica E Cadugan
(74) *Attorney, Agent, or Firm* — WARNER NORCROSS + JUDD LLP

(57) ABSTRACT

In order to mill, drill, saw or the like in the offshore sector, subsea processing machines are used which comprise a tool holder with a change hub for receiving at least one rotary tool, such as for instance a milling cutter, saw, drill or the like. The tool holder preferably has a carrier body for receiving the tool hub, wherein the latter comprises a hub flange for receiving tools. The preferably centric hub ring of the change hub can be arranged on the carrier body of the tool holder and can be connected to the tool holder in such a manner as to be able to be detached and clamped by means of at least one locking apparatus.

15 Claims, 3 Drawing Sheets

(58) Field of Classification Search
CPC ........ Y10T 279/1291; B23B 31/10741; B23B 31/302; B23B 31/30; B23C 5/265; B27B 5/325; B23D 57/0084; B63C 11/52
USPC .................... 279/74, 82, 4.12; 409/232, 234
See application file for complete search history.

(56) References Cited

U.S. PATENT DOCUMENTS

| | | | |
|---|---|---|---|
| 4,710,077 A | | 12/1987 | Ramunas |
| 4,897,014 A | * | 1/1990 | Tietze ................. B25J 15/0491 414/729 |
| 5,125,776 A | * | 6/1992 | Muller ................. B23B 31/302 409/234 |
| 8,056,905 B1 | * | 11/2011 | Lelonek ............. B23B 31/1071 279/82 |

* cited by examiner

Milling Cutter

Fig. 3

Saw

Fig. 4

Drill

Fig. 5

SUBSEA PROCESSING MACHINE COMPRISING A TOOL HOLDER WITH A CHANGE HUB FOR RECEIVING ROTARY TOOLS

The present invention relates to a subsea processing machine.

Such a subsea processing machine which is provided with a tool holder having a carrier body for a tool hub for receiving a corresponding rotary tool, such as a milling cutter, saw, drill and the like, is used substantially in the offshore sector for work subsea, for instance on offshore drilling platforms. This is a critical processing region subsea, wherein the processing machine can only be accessed with effort. In the event that the processing tool, a saw, or a milling cutter is attached under water to the part to be processed and can no longer be detached, it is extraordinarily difficult to find a remedy in this case because the processing machine can then no longer be pulled upwards. Also, in the event of damage to the processing tool, for instance a saw, a corresponding repair is required and it is necessary to detach the tool-receiving carrier, i.e. the hub, and in particular under conditions which prevent a person from releasing the component. Moreover, since the processing machines are used subsea, and in particular mostly in a range of 20 to 50 m below sea level and therefore are difficult and awkward to access, it is correspondingly difficult to detach a corresponding tool hub, which, of course, also applies to the mounting procedure. Direct manual releasing of the component is specifically not possible. Moreover, it is necessary to generate high closure forces for this subsea operation.

SUMMARY

Accordingly, it is the object of the invention to provide a subsea processing machine comprising a tool holder which permits rapid and simple changing of tools and mounting and in this case also permits high closure forces after completion of the mounting procedure and achieves this with the simplest possible design of the tool holder.

This object is achieved in accordance with the invention by the features contained in the characterizing part of claim 1, expedient developments being characterized by the features contained in the dependent claims.

According to the invention, the tool holder has at least one unlocking piston in the tool holder which is part of a piston-cylinder unit and can be disengaged in the direction of the tool hub in relation to the tool holder when pressure is applied accordingly to the cylinder chamber which is located preferably on the tool holder inner side of the piston. A blocking bolt which is oriented with the unlocking piston or unlocking bolt in the locking position is received in the hub ring of the change hub. Said blocking bolt can be pretensioned on its side directed away from the piston at its face-side end preferably by means of a spring element. Furthermore, this blocking bolt has, on its end facing the tool holder, preferably its face-side end, a locking bolt which is locked in the locking position to the carrier body, in particular engages into a corresponding locking formation present at this location. This locking bolt cooperates at the face-side end of the hub ring with a cam formed in such a manner that, when the unlocking piston formed in particular as a bolt is disengaged, the blocking bolt of the change hub is urged into the hub ring with the build-up of pretensioning of the hub-side spring element, wherein the locking bolt is disengaged from the locking formation in the blocking bolt by means of the hub such that the change hub can thus readily be detached from the tool holder. Preferably, the carrier body is a coupling receptacle body, to which the change hub can be coupled.

This mechanism permits not only very rapid and simple detachability of the change hub and also mounting, it also produces a very high closure force with very effective locking between the change hub and the tool holder of the processing machine. This is particularly important in the event that the processing tool seizes up and can no longer be detached subsea from the object to be processed. According to the invention, the change hub can be easily detached from the processing machine, pulled upwards and provided above water where required with a new change hub with a corresponding processing tool. Of course, it is also possible to detach the change hub subsea by deploying divers, optionally it is also possible to perform a mounting procedure subsea, in that a corresponding change hub is taken down where it is mounted with the processing machine. Both options are available.

Seated in an expedient manner on the hub ring is a displacement ring which carries a detention bolt which engages through a guide opening, which is formed preferably by means of a long hole, in the hub ring and is connected to the blocking bolt for conjoint displacement. This is advantageous for mounting of the change hub. If the displacement ring is moved or urged in the direction of the hub flange of the blocking bolt, which can be effected manually, then the spring element allocated to the blocking bolt is pretensioned and builds up a restoring force which—if unrestricted in this manner—urges the blocking bolt outwards out of the interior of the hub ring and in particular in the direction of the tool holder. In this position in which the displacement ring is moved to the hub flange, fixing can be effected by clamps and so the displacement ring and thus also the disengaged locking bolt are fixed in this position. Therefore, the change hub can be easily fitted onto the processing tool. When the change hub is in the decoupled state, in particular if the displacement ring is fixed in the direction of the hub flange, the locking bolt or clamping set protrudes out of the carrier body and thus shows that it is released. If the displacement ring is released, the pretensioning of the spring element causes the blocking bolt to be urged in the direction of the tool holder with the consequence that the locking bolt engages into the latch recess of the carrier body and thus very rapidly the secure locking position between the change hub and tool holder is facilitated in a structurally simple manner. The lower end of the locking bolt or clamping set lies preferably in a surface-flush manner in the latch recess of the carrier body.

In an expedient manner, the unlocking piston also has a spring element on its side remote from the chamber. If the piston is disengaged, which can be effected by hydraulically or pneumatically pressurizing the piston which is designed preferably as a bolt, then the spring element is pretensioned and builds up a restoring force which acts in the direction of a movement of the unlocking piston to the left, i.e. into the interior of the tool holder. The consequence of this is that when the change hub is removed and the cylinder chamber of the piston is relieved of pressure, the piston is then urged automatically to its rest position into the interior of the tool holder.

In an expedient manner, the blocking bolt is received in a bore of the hub ring, and in particular in a translational manner, i.e. displaceable in a reciprocating manner.

The locking bolt is also received in a translational manner, and in particular such that it can be moved from radially inwards in a radial manner outwards. For this purpose, the locking bolt is expediently received and thus forcibly guided in a bore of the hub ring. In an expedient manner, the locking bolt has, at its lower end, i.e. at the radially inner end, a latch lug which can be formed in a simple manner by means of an oblique surface.

In an expedient manner, the latch formation in the carrier body is also provided by means of a recess, which is complementary to the latch formation in the locking bolt, in particular in the form of an identically directed oblique surface which forms the bottom of the latch recess in the carrier body.

In a particularly expedient manner, provision is made that over the periphery of the processing machine, i.e. in particular over the periphery of the carrier body and the change hub, a plurality of locking apparatuses are provided, preferably at a uniform angular spaced interval with respect to one another. In particular, three locking apparatuses, but in particular also two, six or eight locking apparatuses, which are arranged distributed over the periphery have become suitable, wherein a different number of locking apparatuses can also be used depending upon the design. In an expedient manner, this is dependent upon the axial holding force required in each case.

In an expedient manner, the cam is formed by means of a web formation which extends obliquely in cross-section and on which the locking bolt is seated in the manner of a rider and is moved up and down depending upon the movement direction or translational movement of the cam, i.e. is moved upwards in the unlocking direction or radially downwards in the locking direction. By reason of the obliquely extending arrangement of the cam in the locking bolt, a high form-fit or surface connection is produced if the locking bolt is secured in the locking position with respect to the carrier body and in particular with high holding and closure forces.

These and other objects, advantages, and features of the disclosure will be more fully understood and appreciated by reference to the description of the current embodiment and the drawings.

Before the embodiments of the disclosure are explained in detail, it is to be understood that the disclosure is not limited to the details of operation or to the details of construction and the arrangement of the components set forth in the following description or illustrated in the drawings. The disclosure may be implemented in various other embodiments or of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the disclosure any additional steps or components that might be combined with or into the enumerated steps or components.

BRIEF DESCRIPTION OF THE DRAWINGS

Figures 3, 4, 5:
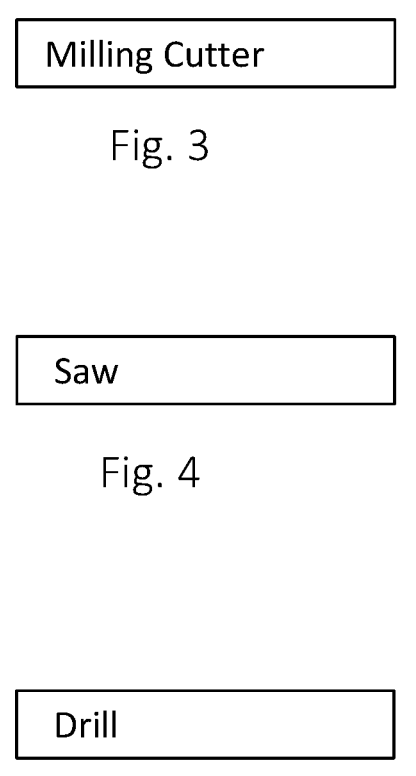

FIG. 3 schematically depicts an embodiment of a rotary tool able to be received by the change hub;

FIG. 4 schematically depicts an embodiment of a rotary tool able to be received by the change hub; and FIG. 5 schematically depicts an embodiment of a rotary tool able to be received by the change hub.

DESCRIPTION OF THE EMBODIMENT(S)

Figure 1:
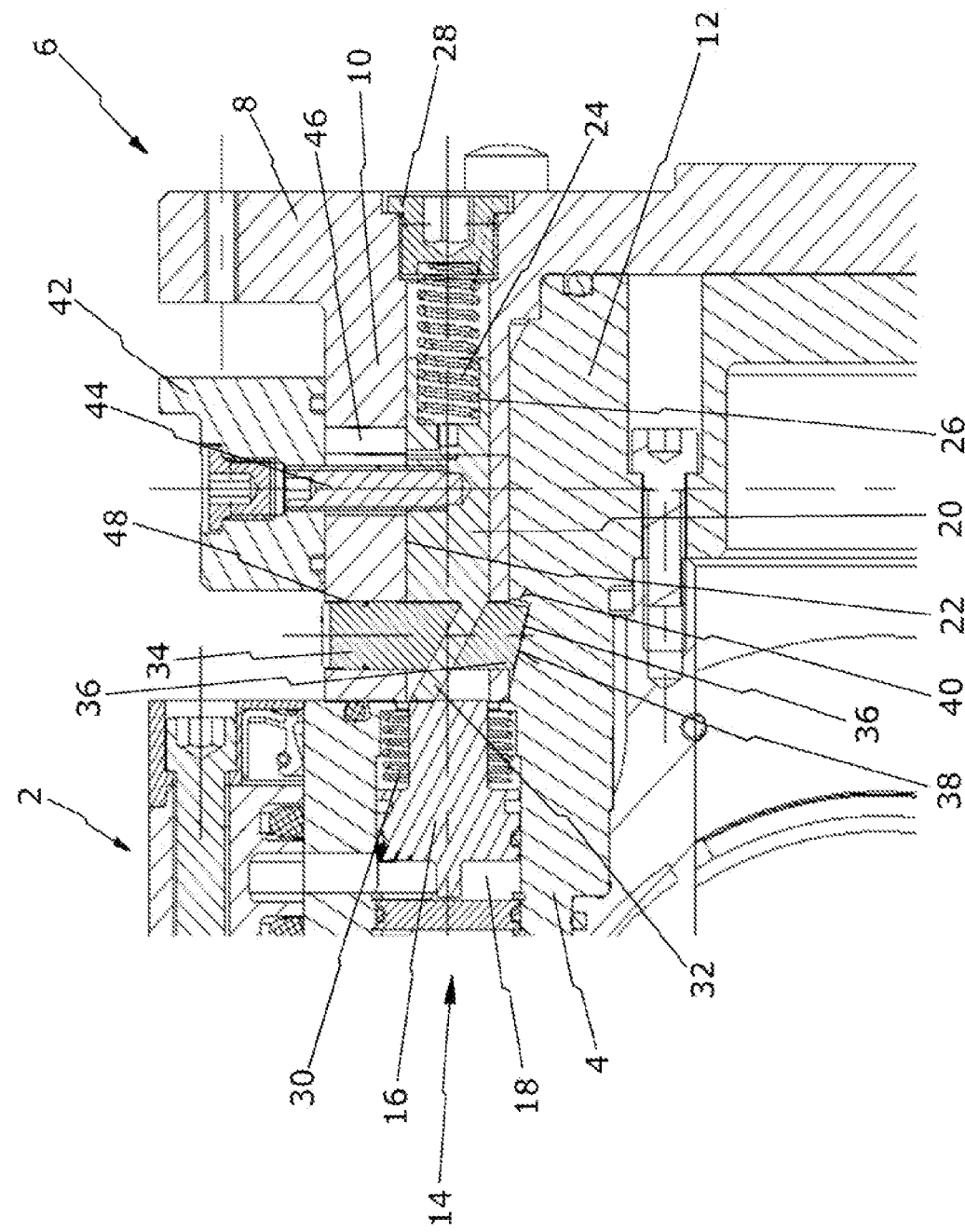
FIG. 1 is a schematic, partial view of a subsea processing machine comprising a tool holder and a change hub arranged thereon in the locking position.

FIG. 1 shows a subsea processing machine for offshore processing by means of milling cutters, drills, saws or the like, comprising a tool holder 2 and a carrier body 4 which is received therein in a central bore and of which the axis coincides coaxially with the central axis of rotation of the processing machine. A change hub designated by the reference numeral 6 is received on the cylindrical carrier body 4 in the locking position as shown in FIG. 1 and is formed having a hub flange 8 and a centric rotationally cylindrical hub ring 10. As shown in FIG. 1, the hub ring 10 is received on a cylindrical sleeve portion 12 of the carrier body 4, said sleeve portion protruding from the tool holder 2. In order to lock the change hub 6 to the tool holder 2, at least one locking apparatus is provided which is described hereinafter, wherein in an expedient manner a plurality of locking devices, which are arranged at the same angular spaced interval over the periphery of the tool holder or the carrier body and the change hub 6, can be provided, in particular three, four, six or eight locking devices depending upon the size, performance capacity and construction type of the processing machine. In this respect, only one locking apparatus is described in greater detail hereinafter and also illustrated in FIGS. 1 and 2 accordingly.

The locking apparatus has a piston cylinder device which is designated generally by the reference numeral 14 and of which the piston is designated by the reference numeral 16. Formed at the end of the piston 16 remote from the hub is a cylinder chamber 18, to which pressure can be applied externally in a hydraulic or pneumatic manner.

A blocking bolt 20 is provided on sides of the change hub 6 in a manner oriented with the piston axis, said blocking bolt being received in a translationally displaceable manner in a bore 22 of the hub ring 10. Both the piston axis and the axis of the blocking bolt 20 oriented with the piston axis in the locking position shown in FIG. 1 are in parallel with the axis of rotation or axial axis of the processing machine or the carrier body 4. The piston 16 and the likewise translationally displaceable blocking bolt 20 can each be pretensioned by means of a spring element, wherein a spring element 24 is received in a recess 26 of the blocking bolt 20 and is attached to a screw bolt which is screwed into the hub flange 8 and is designated by the reference numeral 28. The consequence of this is that when the blocking bolt 20 shown in FIG. 1 is moved to the right, the spring element 24 is pretensioned accordingly and builds up a restoring force which is directed in the direction of the blocking bolt 20 to the left to the tool holder 2.

A spring element 30 is arranged on the piston 16 and in particular at the end of the piston 16 which is directed towards the hub 6. In this case, it is also applicable that when the piston 16 is disengaged to the right, the spring 30 becomes pretensioned and thus builds up a restoring force on the piston 16 which acts in the direction of the piston to the left.

In the illustrated exemplified embodiment, the blocking bolt 20 has, at its end facing the tool holder 2, a cam 32 which projects from the face-side end of the blocking bolt 20 in the direction of the tool holder 2, i.e. directed away from the hub. The cam 32 illustrated in section forms in this respect an obliquely extending web 32 or an obliquely extending flange which extends radially from the inside upwards from the face-side end of the bolt 20 in the direction of the tool holder 2. Seated on this cam 32, as a rider so to speak, is a locking bolt 34 which is provided which a recess complementary to the cam 32 and can be displaced longitudinally of the cam 32. The locking bolt 34 engages through the hub ring 10 and engages with its lower end as shown in FIG. 1 into a latch formation 38, formed as a latch recess, in the carrier body 4, more specifically in the cylindrical sleeve portion 12, thus establishing the locking position for the change hub 6. In the illustrated exemplified embodiment, the locking bolt 34 has, at its lower end, i.e. the end directed towards the carrier body, a latch lug which is designated by the reference numeral 36, is formed in this case by means of an oblique surface and of which the inclination extends from left to right and thus radially downwards in the illustrated exemplified embodiment shown in FIG. 1. The latch lug 36 engages into a complementary latch formation in the form of a latch recess 38 which has a blocking shoulder 40.

Seated on the hub ring 10 is a displacement ring 42 which is guided axially on the outer peripheral surface of the hub ring 10, is fixedly connected to the blocking bolt 20 by means of a detention bolt 44 engaging through the hub ring 10 and in this case according to the illustrated exemplified embodiment engages into a screw bore of the blocking bolt 20 and is fixedly connected to the bolt 20 by means of a screw connection. In this case, the detention bolt 44 engages into a guide opening 46, which extends in the longitudinal direction and is formed in particular as a long hole, in the hub ring 10, or engages through this opening 46 such that when the displacement ring 42 is moved to the right, the blocking bolt 20 is likewise moved to the right with the build-up of pretensioning on the spring element 24, and in particular in the direction of the hub flange 8. If the blocking bolt 20 is moved to the right, then the locking bolt 34 moves upwards on the hub, which is moved to the right at the same time as the piston, and in particular radially upwards as a result of the forced guidance of the locking bolt 34 in a bore 48 of the hub ring 10, which effects unlocking of the hub.

In order to remove the change hub 6, which is locked to the carrier body 4, in the event of damage to a rotary tool, for instance a saw, from the tool holder 2 subsea, the cylinder chamber 18 of the tool holder 2 is pressurised either hydraulically or pneumatically such that the piston 16 is moved to the right out of the tool holder 2 and in this case by reason of the contact with the cam 32 moves the blocking bolt 20 to the right against the spring element 24 which is designed preferably as a compression spring and is pretensioned. As a result, the locking bolt 34 which is seated as a rider on the web 32 is compelled to move upwards and moves out of the locking position into the unlocking position in which the locking bolt 34 is disengaged upwards from the locking position illustrated in FIG. 1 with engagement of the latch lug 36 into the latch recess 38. In this position, i.e. the unlocking position, the change hub 6 can be removed towards the right in order to pull the processing machine upwards and change the processing tool.

Figure 2:
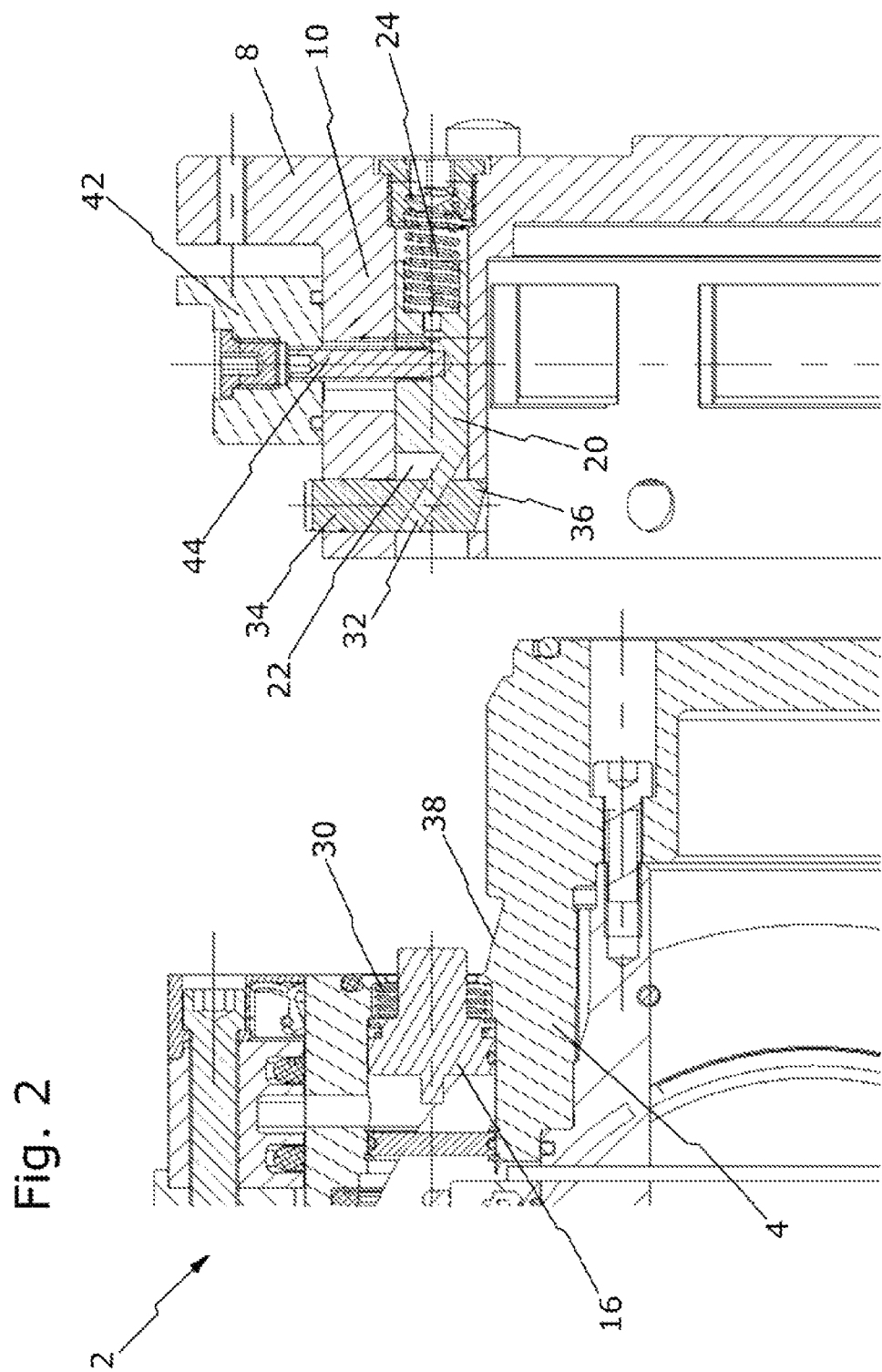
FIG. 2 is a schematic view according to FIG. 1, with an unlocked and removed change hub.

For mounting purposes, as shown in the view of FIG. 2 the displacement ring 42 is urged manually or in a motor-driven manner to the right in the direction of the hub flange 8, wherein by means of the detention bolt 44 the blocking bolt 20 is also moved simultaneously to the right, and in particular with spring pretensioning of the spring element 24 which in this case is designed in an expedient manner as a compression spring. As the blocking bolt 22 moves to the right in the direction of the hub flange 8 by reason of the corresponding displacement of the displacement ring 42, the locking bolt 34 is guided upwards by reason of its forced guidance on the cam 32 and is thus located in the unlocking position such that in this position the change hub 6 can be pulled or slid easily onto the carrier body 4 which is illustrated on the left in FIG. 2. The displacement ring 42 which for the mounting position on the right is urged in the direction of the hub flange 8 can be clamped in the disengaged position of the locking bolt 34 with the change hub 6, in particular the hub flange 8 and can thus be expediently clamped, which can be performed in a suitable manner, in particular e.g. by means of corresponding steel clamps or a resilient pressure piece. If they are detached, then as a result of the pretensioning of the spring element 24, the blocking bolt 22 is urged to the left, wherein the unlocking bolt 16 which is disengaged as shown in FIG. 2 is urged to the left, i.e. into the interior of the tool holder 2 with the spring element 30 being relieved, such that the locking bolt 34 then engages into the latch recess 38 of the carrier body 4 and therefore the latch lug 36 of the locking bolt 34 lies against the blocking shoulder 40 and therefore the change hub 6 is fixedly connected or coupled to the tool holder 2. In this case, by reason of the illustrated mechanism, high closure forces and at same time low pretensioning are produced. The locking mechanism provides a high level of closure reliability. The form-fitting surface connection of the blocking bolt or the locking apparatus can be configured by means of suitable selection of the size and pitch factors depending upon the application. This described system is suitable in particular for detaching a tool carrier, in this case a change hub, subsea.

The invention claimed is:
1. A subsea processing machine comprising:
a tool holder; and
a change hub for receiving at least one rotary tool,
wherein the tool holder has a cylindrical carrier body for receiving the change hub,
the change hub includes:
a hub flange and a hub ring,
wherein the change hub is configured for receiving the tool holder, wherein the hub ring protrudes centrically from the hub flange, and wherein the centric hub ring is arranged on the carrier body so as to be able to be detached from the carrier body and so as to be able to be locked to the carrier body via at least one locking apparatus,
characterized in that
the at least one locking apparatus includes an unlocking piston and a blocking bolt, the unlocking piston is received in a chamber that is in the tool holder, the chamber is configured to be pressurized, the blocking bolt is oriented with the unlocking piston such that a longitudinal axis of the blocking bolt and a longitudinal axis of the unlocking piston are in parallel with an axis of rotation of the carrier body, and the blocking bolt is received in the hub ring, the blocking bolt can be pretensioned at one longitudinal end that is distal from the tool holder via a spring element, a locking bolt is disposed at a second longitudinal end of the blocking bolt that is proximal the tool holder, which wherein when the locking bolt is in a locking position, the locking bolt engages into a locking formation on the carrier body and cooperates with a cam that is located at an end of the blocking bolt, wherein when the unlocking piston is moved outwards in a direction towards the change hub as a result of pressurization in the chamber, the unlocking piston presses the blocking bolt into the hub ring and the locking bolt is disengaged via the cam from the locking formation such that the change hub can be detached from the tool holder.

2. The subsea processing machine as claimed in claim 1, wherein the locking bolt is seated on the cam, and wherein a displacement ring is seated on the hub ring and carries a detention bolt which extends through a guide opening in the hub ring, the detention bolt is connected to the blocking bolt for conjoint displacement such that by displacing the displacement ring in a direction toward the hub flange, the blocking bolt is urged into the hub ring with pretensioning of the spring element such that the locking bolt seated on the cam is moved into an unlocking position.

3. The subsea processing machine as claimed in claim 1, characterized in that the unlocking piston has, on a longitudinal side of the unlocking piston that is remote from the chamber, a spring element pretensioned by the unlocking piston, and wherein the unlocking piston can be moved outwards as a result of pressurization of the chamber.

4. The subsea processing machine as claimed in claim 1, characterized in that the blocking bolt is received in a translational manner in a bore of the hub ring, the bore being parallel with an axis of the hub ring.

5. The subsea processing machine as claimed in claim 1, characterized in that the locking bolt is received in a radial bore, radial with respect to the axis of rotation of the carrier body, of the hub ring, and the locking bolt has, on an end of the locking bolt that is closest to the blocking bolt, a latch lug formed by an oblique surface.

6. The subsea processing machine as claimed in claim 5, characterized in that the locking formation on the carrier body is a recess, complementary to the latch lug, which recess is formed with an oblique surface at a bottom of the recess, and wherein the oblique surface of the recess and the oblique surface of the latch lug are identically directed.

7. The subsea processing machine as claimed in claim 1, characterized in that the at least one locking apparatus comprises a plurality of locking apparatuses that are arranged at a uniform angular spaced interval provided over a periphery of the carrier body and change hub.

8. The subsea processing machine as claimed in claim 1, characterized in that the carrier body and the hub ring are formed in a cylindrical manner about an axial axis of the processing machine.

9. The subsea processing machine as claimed in claim 1, characterized in that the cam is a web-like flange which extends in an oblique manner in cross-section and extends from radially inwards with respect to a rotation axis of the processing machine to radially outwards from an interior of the hub ring to an exterior of the hub ring.

10. The subsea processing machine as claimed in claim 9, characterized in that the locking bolt is provided with a recess, with which recess said locking bolt is seated on the cam in a displaceable manner.

11. The subsea processing machine as claimed in claim 2, characterized in that a central axis of the displacement ring is formed coaxially with a central axis of the change hub.

12. The subsea processing machine as claimed in claim 1, wherein the rotary tool is a milling cutter.

13. The subsea processing machine as claimed in claim 1, wherein the rotary tool is a saw.

14. The subsea processing machine as claimed in claim 1, wherein the rotary tool is a drill.

15. The subsea processing machine as claimed in claim 10, wherein the locking bolt is configured in the manner of a rider.

\* \* \* \* \*

UNITED STATES PATENT AND TRADEMARK OFFICE
CERTIFICATE OF CORRECTION

| | |
|---|---|
| PATENT NO. | : 11,794,258 B2 |
| APPLICATION NO. | : 16/973013 |
| DATED | : October 24, 2023 |
| INVENTOR(S) | : Hans-Erich Maul et al. |

It is certified that error appears in the above-identified patent and that said Letters Patent is hereby corrected as shown below:

In the Claims

Column 6, Claim 1, Line 63:
"bolt that is proximal the tool holder, which wherein"
Should be:
– bolt that is proximal the tool holder, wherein –

Column 8, Claim 10, Line 23:
"cam in a displaceable manner."
Should be:
– flange in a displaceable manner. –

Signed and Sealed this
Twelfth Day of December, 2023

Katherine Kelly Vidal
*Director of the United States Patent and Trademark Office*